Dec. 2, 1952 W. C. DE VRIES 2,620,398

VOICE FREQUENCY SIGNALING SYSTEM FOR TELEPHONE SYSTEMS

Original Filed June 14, 1947 2 SHEETS—SHEET 1

INVENTOR.
WILLEM C. de VRIES

BY Brown, Jackson, Boettcher & Dienner

ATTORNEYS

Dec. 2, 1952 W. C. DE VRIES 2,620,398

VOICE FREQUENCY SIGNALING SYSTEM FOR TELEPHONE SYSTEMS

Original Filed June 14, 1947 2 SHEETS—SHEET 2

INVENTOR.
WILLEM C. de VRIES
BY Brown, Jackson, Boettcher & Dienner
ATTORNEYS

Patented Dec. 2, 1952 2,620,398

UNITED STATES PATENT OFFICE 2,620,398

VOICE FREQUENCY SIGNALING SYSTEM FOR TELEPHONE SYSTEMS

Willem C. de Vries, The Hague, Netherlands, assignor to Staatsbedrijf Der Posterijen, Telegrafie En Telefonie, The Hague, Netherlands Original application June 14, 1947, Serial No. 754,759. Divided and this application January 15, 1948, Serial No. 2,447. In the Netherlands October 2, 1946

18 Claims. (Cl. 179—2)

The invention is relative to tool (trunk) national or international telephone systems, wherein the signalling is effected with one or more frequencies in the speech band to be transmitted. The present application is divisional of my prior application Serial No. 754,759, filed June 14, 1947, from which Patent No. 2,567,148 issued on September 4, 1951.

Special measures should always be taken in these voice frequency signalling systems to prevent the speech from disturbing the signal receivers.

These difficulties might obviously be solved by arranging a band filter between the speaking subscriber and the extremity of the related system, which filter would block the frequencies used for the signalling if they are present in the speech.

By this method the filter frequency band is, however, also suppressed in the speech, which is detrimental to the clarity of the speech transmission.

Other proposed measures, not subject to the above objection, are the use of:

(*a*) a signal frequency in the higher part of the speech band to be transmitted;

(*b*) a relatively high transmission energy for the signal frequency;

(*c*) a signal consisting of a mixture of 2 single frequencies;

(*d*) a signal receiver provided with an arrangement making this receiver non-responsive if there are also other frequencies than the signal frequencies present in the current received (blocking circuit);

(*e*) a signal receiver that only operates at a signal from one direction (direction-sensitive);

(*f*) a signal of a definite space of time.

All these known measures mentioned from *a* up to and including *f* in principle, however, cannot prevent the signal receiver from functioning inadvertently when it should not, if the frequencies used for signalling happen to be present in the speech with sufficient strength during a sufficient space of time and not mixed, or substantially not mixed, with other frequencies. Of course, such fault of inadvertent or unauthorized operation also occurs if such frequency or frequencies are imitated on purpose.

The object of the invention in question is the creation of a telephone system, wherein the signalling system is prefectly secured against faults caused by the frequencies used for signalling being accidentally or on purpose present in the speech, but without the speech transmission being appreciably effected.

This object is realised according to the invention by providing each extremity of the telephone system with a direction-sensitive signal suppressor, which is selective for the frequencies used for signalling and which, if need be, influences the value of these frequencies which are incidentally present in the speech, in such a way that these frequencies (when present in the speech) cannot cause the signal receivers of the telephone system to function.

The signal suppressor principle comprises an electron tube or valve arrangement, which is controlled by the frequencies used for signalling, and which arrangement regulates the attenuation of a variable attenuation network inserted in the speech circuit.

Further characteristics of the invention have been mentioned in the following description in which some examples will be explained in greater detail by means of additional drawings.

Figures 4, 5:
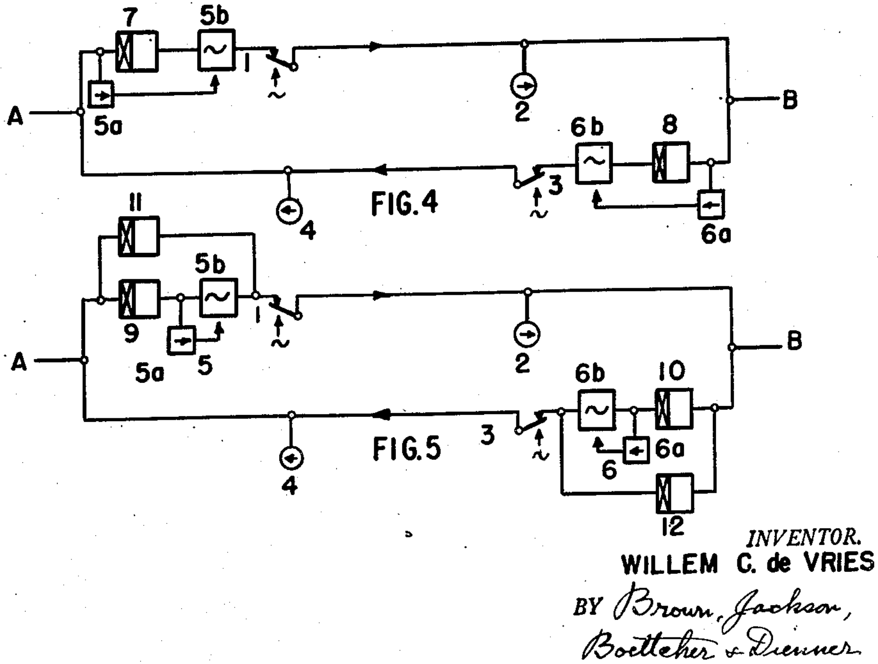
Figures 6, 6A:
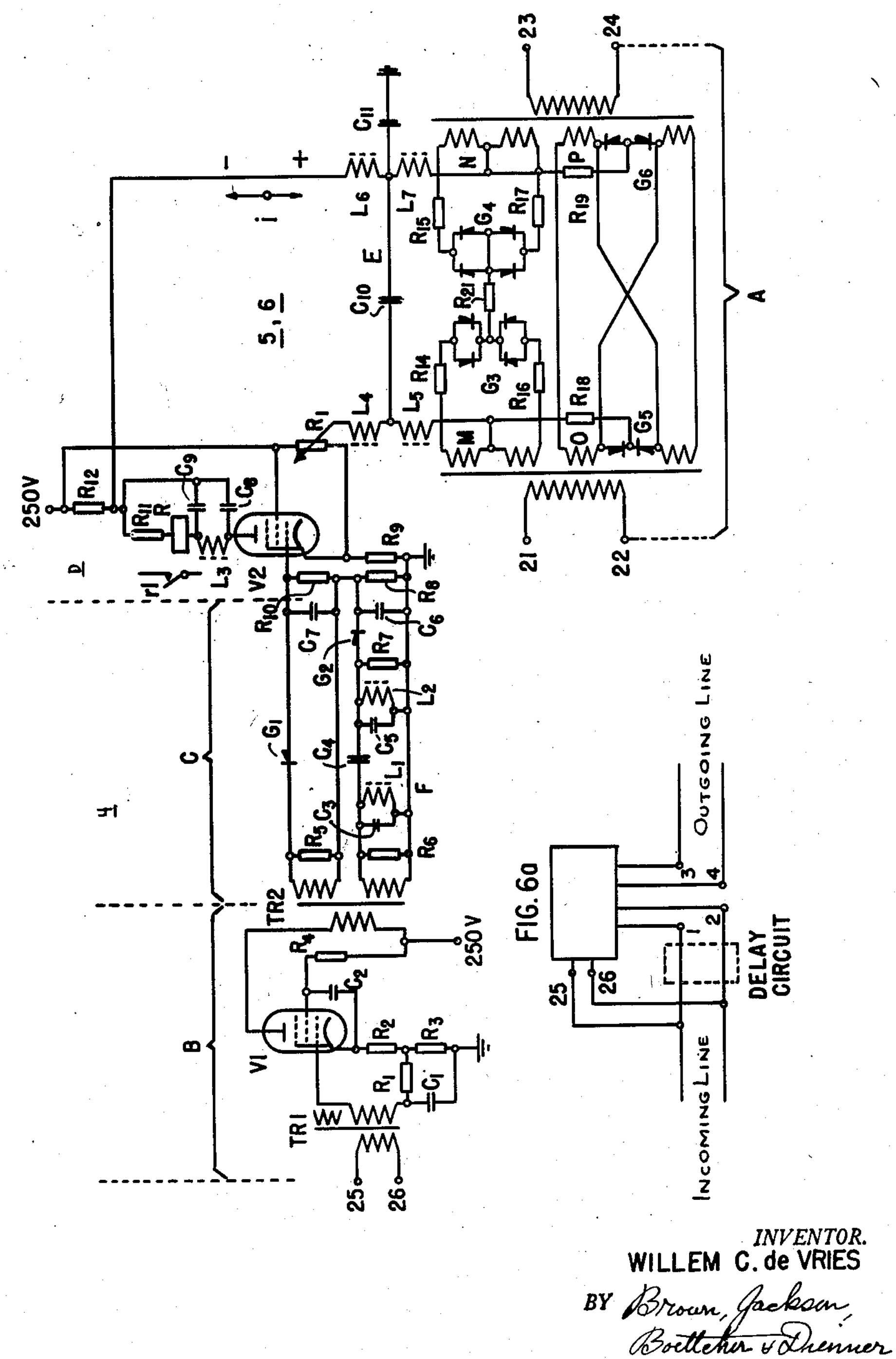

Fig. 4, by way of example, represents a 4-wire telephone system, provided with signal suppressors having delay circuits;

Fig. 5 is the same as Fig. 4, but provided with signal suppressors having band filters, and Fig. 6 is a schematic diagram of a signal receiver and an associated barring or signal suppressing unit and Figure 6*a* is a schematic sketch of a delay circuit arrangement as used with the signalling equipment.

Each of the 2- or 4-wire telephone systems can, for example, be automatically constructed by means of selectors from several 2- or 4-wire (carrier) circuits. As to the signalling system, each of the before mentioned systems forms a whole, the signals being transmitted direct from one extremity of the system to the other. Such a 4-wire system is well known to those skilled in the art, having been described in numerous prior texts and prior art patents, such as Netherlands Patent Letter No. 36,968.

Figure 1:
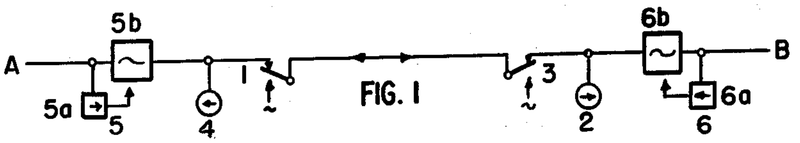
Fig. 1 is a schematic circuit diagram illustrating the principle of the invention for a two-wire telephone system with voice frequency signalling.
Figure 2:
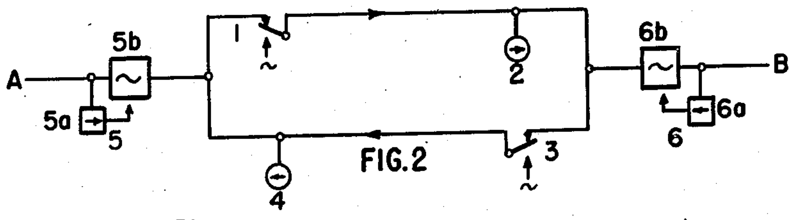
Fig. 2 is the same as Fig. 1 but for a 4-wire system with signal suppressors in the 2-wire part.

The operation of the arrangement according to Figure 1 and Figure 2 is as follows.

The voice frequency signals are transmitted over the circuit by the contacts of any conventional signal transmitters or signal transmitting relays 1 and 3, which are shown as being located adjacent to the A end and B end, respectively, of the circuit. These signals are received by direction sensitive signal receivers 2 and 4 which are located adjacent to the B end and to the A end, respectively. The receiver 2 is directionally sensitive to signals transmitted from transmitter 1 in the direction A—B, and the receiver 4 is directionally sensitive to signals transmitted from transmitter 3 in the direction B—A. At the receivers 2 and 4, these signals are made to perform any desired functions intended to be performed by said signals.

According to the invention, each extremity of the voice frequency signalling system contains signal suppressors 5 and 6, which are selective for the frequency used for signalling (hereinafter called signal frequency). As shown in each of the Figures 1–5, inclusive, each of the suppressors 5 and 6 are respectively comprised of an electronic tube detector 5*a* or 6*a* and an attenuation network 5*b* or 6*b*. The suppressors have, moreover, been constructed in such a way that they are only sensitive for the speech coming unidirectionally from the end A or the end B, as indicated by the arrows. That is to say, the signal suppressor 5 is directionally sensitive to speech frequencies transmitted over the circuit in the direction A—B, and the signal suppressor 6 is directionally sensitive to speech frequencies transmitted over the circuit in the direction B—A.

The task of each signal suppressors 5 and 6 is to influence, if need be, the signal frequency which is incidentally present in the speech in such a way that the particular signal receiver 2 or 4 which is located at the other extremity of the circuit, cannot function inadvertently in response to such signal frequency incidentally present in the speech.

Figure 3:
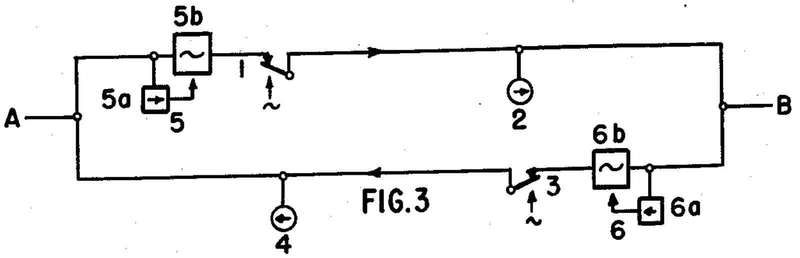
Fig. 3 is the same as Fig. 2 but with signal suppressors in the 4-wire part.

The function of the arrangement according to Figure 3 is almost similar to that of Figures 1 and 2, with the difference, however, that the signal suppressors in this case need not be constructed especially direction-sensitive. The signal frequency being incidentally present in the speech can be influenced in various manners.

In the arrangement according to Figure 4 a delay circuit 7 has been inserted into the speech circuit between the input of the electron tube arrangement 5*a* and the variable attenuation network 5*b* of the signal suppressor. The propagation time of this delay circuit is at least equal to the response time of the signal suppressor. This arrangement makes it possible to influence the signal frequency incidentally present in the speech during the whole process of it.

According to the arrangement of Figure 3 (without delay circuit 7) it is of course not possible to prevent the extremely short momentary condition wherein during the time that the signal suppressor is getting into operation a small part of the signal frequency that is incidentally present in the speech penetrates into the signalling system without being suppressed by the signal suppressor. As, however, the signal suppressors 5 and 6 do not contain mechanical parts, like relays, they can react very quickly. This reaction time is so short (i. e. a few milliseconds) that the signal receivers 2 or 4 cannot possibly function in this short time, particularly in view of the fact that such signal receivers always contain one or more mechanical relay parts, etc.

I shall now describe the manner in which the signal frequency that is incidentally present in the speech is influenced. With reference to Figure 6, a signal receiver 4 is shown in operative relation with a suppressor unit 5 or 6. The manner in which each of these units may be individually used in the representative blocks 5*a*, 5*b*, 6*a* and 6*b*, of Figures 1 to 5, inclusive, becomes apparent with reference to the disclosure of these figures.

The suppressor device, which is shown at A in Figure 6, is arranged to be operative responsive to the direction of flow of the direction current therethrough to provide variable attenuations of the speech currents in the associated line. The attenuator unit, by reason of its filter configurations, has an extremely steep attenuation characteristic, whereby with the presence of small positive values of direct current, very little attenuation of the speech currents is effected and with the presence of a very small negative value of direct current the attenuation of the speech currents is quite large. The electronic detector tube V2 connection in the arrangement is normally nonconductive and, accordingly, positive direct current is normally provided for the suppressor circuit whereby little attenuation of the speech currents is effected. However with receipt of a frequency in the signal range, the flow of negative direct current in the suppressor circuit is effected and a very high attenuation for the speech current is provided.

With reference to Figure 6, the incoming terminals 21 and 22 and the outgoing terminals 23 and 24 are connected to a network comprising a group of resistances R14, R15, R16, R17, R18, R19, and R21 and a series of rectifier units G3 and G4, G5 and G6 which are arranged with the resistances to effect the aforedescribed attenuator operating characteristics. Resistances R14, R15, R16, and R17 are adapted to terminate the connecting lines in such manner as to avoid interfering reflections of the signal at the operating frequencies of the system.

The signal receiver 4, which is shown in Figure 6 in combination with the suppressor A, may comprise a conventional repeater stage B, a filter arrangement C which is operative to provide bias voltages which are proportional to the values of the speech and signal frequencies, and an electronic detector D which is operated by the potentials of the filter arrangement to control the operations of an associated signal relay R and the suppressor device A. The output circuit of the detector arrangement D is shown connected to the suppressor unit A by a variable resistance member R13 and a low pass filter arrangement comprising coil units L4, L5, L6, L7, condenser units C10 and C11.

The repeater stage B may be comprised of a conventional telephone repeater unit, and as illustrated in the present embodiment, includes incoming terminals 25 and 26 which are connected through the primary winding of an input transformer unit TR1 to a thermionic amplifier tube V1 and its associated resistance and capacitance networks including R1, C1 and R2, R3. The output circuit of the thermionic tube is connected over the primary winding of transformer TR2 to a positive potential source of 250 volts and over resistance R4 and condenser C2 to the tube suppressor grid and cathode. The secondary windings of transformer TR2 are connected to the filter networks of unit C, the upper band filter of which is arranged to receive and pass the full frequency width and which is comprised of a rectifier G1, resistance R5, condenser C7, and resistance R10.

The lower filter unit, which is somewhat similar to the well known, three-element $\pi$ section type filter, comprises a resistance R6, parallel condenser C3 and coil L1, condenser C4, parallel condenser C5, and coil L2, resistance R7, rectifier G2, condenser C6 and resistance R8, which are arranged to pass the part of the speech frequencies that are situated in the signal band, that is, to give a low attenuation for the signal frequency and the necessary side bands.

The output of the lower band filter appears across resistance R8 and the output of the upper band filter appears across resistance R10, both of which resistances are connected to the grid of the thermionic tube of the detector stage D. Resistance R9 is connected in the cathode circuit of the thermionic detector tube and to the output circuit of the lower band filter. The plate or output circuit of the thermionic detector tube V2 is connected over a low pass filter comprising coil L3 and condensers C8 and C9, to a signal relay R, a resistance R12 and a positive 250 volt power supply.

The lower pass filter in its connection between the output of the tube and the signal relay is effective to prevent interferences of short duration in the spectrum of the signal frequency from operating the signal relay R. Contact *r1* of the signal relay is arranged to pass the signal on to the telephone exchange in an obvious manner.

The output circuit of the thermionic detector tube is connected to the suppressor device A by a low pass filter E which comprises coils L4, L5, L6, L7, and condensers C10, C11. The low pass fiter E is effective to eliminate the high frequency alternating current of the signalling tone from the suppressor circuit A and is arranged to have a high cut off frequency (1500 to 2000 cycles per second) whereby the operation of the suppressor is unaffected thereby.

With the receipt of speech current over the line, the repeater unit B is operative to amplify the speech current, and transmit the amplified speech signal over the transformer unit TR2 to the band filtering devices of unit C. The portion of the speech frequencies which are situated in the lower band filter transmission band are rectified by rectifier G2 and a positive voltage appears across resistance R8 for application to the grid of the detector tube V2.

Rectifier G1 rectifies the full frequency width and with receipt of the speech current effects the provision of a proportionate negative voltage across R10 for application to the grid of the detector tube V2. Inasmuch as with the presence of speech current, the negative voltage which appears across R10 will be considerably greater than the positive voltage which appears across resistance R8, the detector tube will be maintained biased in its cut-off position, and there will be no attenuation of the speech current.

The lower network of the attenuator will therefore be energized by positive current from the 250 volt potential source over resistance R12, coils L6 and L7, resistance R19, rectifier G6, coils O and P, rectifier G5, resistance R18, coils L4 and L5, resistances R13 and R9 to ground. Signal relay R will accordingly remain inoperative, and the speech currents will be transmitted over the lower path of the network with little attenuation.

On receipt of a signal frequency at terminals 25 and 26 of the signal receiver, the signal is amplified by the electronic amplifier tube V1 and transmitted over transformer TR2 to the band filter device F. Rectifier G2 will be operative to provide a positive voltage across R8 which is somewhat greater than the negative voltage provided by rectifier G1 across resistance R10, and accordingly detector tube V2 becomes conductive. Signal relay R is responsively operated over a path extending from the positive potential source over resistance R12, the signal relay R, the low filter network detector tube V2 and resistance R9 to ground. A parallel path for the upper portion of the attenuating network is simultaneously completed, such path extending from the positive potential source over resistance R13, coils L4 and L5, coils M, resistances R14 and R16, rectifier G3, resistance R21, rectifier G4, resistances R15 and R17, coils N, coils L6 and L7, the signal relay R, detector tube V2 and resistance R9 to ground. A very high attenuation is thus effected in the suppressor unit to suppress the speech currents in the telephone line. Signal relay R at its contacts *r1* effects the passage of the signal to the telephone exchange in an obvious manner.

In that the signal relay is connected to the output of the detector tube V2 over a low pass filter arrangement, the interferences of short duration in the spectrum of the signal frequency do not operate the signal relay R. However, the current through the barring device A is not delayed so that the barring device experiences a certain reaction in the case of short interferences in the spectrum of the signal frequency which are of a sufficiently high level. The degree of interference is dependent upon the value of the compensation current provided for the suppressor unit which is determined by the amount of resistance inserted in the circuit by the adjustment of variable resistance R13. The degree of interference is also strongly influenced by the choice of the signal frequency, a signal frequency of 2000 and 3000 cycles per second having been determined as being particularly well adapted for use in the described installation.

The interferences can be further reduced by providing a barring current circuit with a sufficiently low cut-off frequency. However, in applying this measure, the barring device may remain inoperative for too long a period with the occurrence of a signalling operation and the passing tone may cause a fault in the next exchange. To eliminate the last mentioned fault a delay circuit such as shown in Figure 6*a* may be provided to increase the operation time. It is of course not necessary for the signal suppressors 5, 6 to respond if the strength or energy level of the signal frequency contained within the speech is so small that the signal receiver at the other extremity of the system cannot respond to it. Consequently the signal suppressor needs only to start operating if the signal strength or energy level mentioned above is larger than that value which just prevents this signal receiver from functioning; also during the response of the signal suppressor it is sufficient to insert only so much attenuation into the speech circuit as is necessary to suppress the signal strength down to the level of the non-effective signal strength mentioned before.

This means that it should be possible to express the relation between the attenuation that is to be inserted, and the input level in a straight line, and it is assumed or suggested that the impedance of the attenuation network remain about constant and equal to the line impedance.

Through this method of regulation, it is possible to reduce the influence that is exercised by such a signal suppressor on the speech transmission to a negligible minimum. Since, in most cases, a frequency lying in the higher part of the speech band is chosen for the signal frequency, the possible reaction on speech will only occur if this high frequency is present in the speech to a relatively high volume level. Just then the sound is, however, strong and the effect of inserting some extra attenuation is consequently unimportant.

If, in the preceding case, it is desired to prevent the other frequencies from experiencing some extra attenuation, this may be realised by arranging 2 band filters in parallel in the speech circuit, one for passing the signal frequency and the other for passing all the other frequencies occurring in the speech band to be transmitted. The signal suppressor is then inserted only in the circuit of the first bandfilter. This arrangement has been represented in Figure 5 in which the two bandfilters have been indicated at 9 and 10 for passing the signal frequencies, and at 11 and 12 for passing the other frequencies.

An even better arrangement can be obtained by equipping a device that renders the relevant apparatus (signal receiver or signal suppressor) inactive, if there are (also) other frequencies present than the signal frequency (blocking circuit).

If namely such a blocking circuit is equipped in the signal suppressor, the number of cases in which this suppressor reacts on the speech is restricted to those rare cases in which the signal frequency is alone and in a sufficient capacity present in the speech. It stands to reason that the signal receivers of the system in this case must also be equipped with a blocking circuit.

From the preceding explanation it will be seen that the invention covers the range between the simple case on the one hand in which the signal frequency band is drastically removed from the speech by a filter and the complicated case on the other hand in which the most complicated signal receiver is employed, but without special expedients at the beginning of the signalling system, such as the signal suppressors 5, 6.

In the first mentioned case, the clarity of speech transmission is likely to be badly distorted; and in the second mentioned case, there is never complete assurance against false reaction to speech.

As a matter of fact, the invention is based on the insight that a signal suppressor at the beginning of the signalling system equipped with devices serving to prevent response to speech that are not too complicated, permits the use of duplicate signal receivers, so arranged that false reactions are eliminated. In those relatively rare cases in which the signal receiver that is not too complicated would operate faultily, the signal suppressor is going to function and thereby prevent erroneous operation.

When employing only the signal receivers 2, 4 these would, however, be serious faults, the infrequent functioning of the signal suppressors 5, 6 only meaning that the speech transmission is influenced to a negligibly slight extent. In proportion as the signal suppressor and the signal receiver are made more complicated, the number of times that the signal suppressor will come in action is reduced. Then the apparatus will become more expensive; but in consequence thereof the speech transmission will be influenced less. It is a compromise of quality and cost. In all cases, however, a totally safe signalling is obtained, while through use of the invention the practical requirements with reference to the reaction of the signal receiver to speech are made much less severe than the demands that have to be made upon a signal receiver when not using the signal suppressor. The choice of the most recommendable compromise is wholly based on practical considerations, there always being a relation between the things applied in the signal suppressor and the things applied in the signal receiver.

Finally it may be observed that such a signalling system that is secured against disturbance by the speech, is automatically also secured against faults caused by another signalling system operating with the same frequency as shown in my copending United States application, Serial No. 754,759 filed June 14, 1947 (corresponding Netherlands application No. 125,930).

While I have illustrated what I regard to be the preferred embodiment of my invention, nevertheless it will be understood that such is merely exemplary and that numerous modifications and arrangements may be made therein without departing from the essence of the invention.

I claim:

1. In a telephone system of the class described, the combination of a communication path for conducting speech transmissions as applied thereto, signal transmitter means connected to said path for transmitting voice frequency signals thereover, signal receiver means connected to said path for accomplishing signal operations responsive to receipt of said voice frequency signals, and signal suppressor means including rectifier means connected to said path for monitoring speech transmissions in the direction from said transmitter to said receiver, signal detector means connected therein operative to detect the presence of frequencies in said speech transmissions which are of said signal frequency, and attenuating means operatively controlled by said signal detector means with detection of said signal frequency to attenuate same to prevent false operation of said signal receiver by said equivalent frequencies in said speech transmissions.

2. In a telephone system of the class described, the combination of a communication path for conducting speech transmissions between at least a pair of stations, signal transmitter means at said first station connected to said channel for transmitting voice frequency signals thereover to said second station, signal receiver means at said second station for accomplishing signalling operations responsive to receipt of said transmitted voice frequency signals, speech transmitter means at said first station for applying speech transmission to said path, and signal suppressor means at said first station connected to said path between said transmitter and the point of application of the speech thereto, rectifier means connected to make said suppressor means directionally sensitive, and signal detector means connected to said path operative to detect the presence of said signalling frequencies in the applied speech which is transmitted toward said receiver, and attenuating means controlled by said signal detector means to attenuate such frequencies in the speech to prevent false operation of said signal receiver thereby.

3. In a telephone system of the class described, the combination of a communication path for carrying speech transmissions, signal transmitter means connected to said path at a first point (A) for transmitting voice frequency signals thereover, signal receiver means connected to said path at a second point (B) for accomplishing signalling operations thereat in response to receipt of said signals from said first point (A), and signal suppressor means at said first point connected to said path between said transmitter and the point of application of speech to said path thereat, for attenuating frequencies of said signal frequency value as present in said speech transmissions; said suppressor means including electronic signal detecting means operative to detect the presense of frequencies in said applied speech transmissions which are of said signal frequency value, and attenuating means controlled by said signal detector means to introduce only so much attenuation into the circuit as is necessary to prevent the signal receiver from being inadvertently operated by the frequencies in the speech band.

4. In a telephone system, the combination of a communication path for linking a plurality of stations for communication purposes, signal transmitter means located at one of said stations (A) operative to transmit voice frequency signals over said path, signal receiver means located at a second one of said stations (B) for accomplishing signalling operations thereat including circuit control means connected therein to render said signal receiver means directionally sensitive to signals transmitted by said signal transmitter means at said first station, signal transmitter means located at said second station operative to transmit voice frequency signals over said path in the direction of said first station, signal receiver means located at said first station for accomplishing signal operation thereat including circuit control means connected therein to render same directionally sensitive to signals transmitted by said signal transmitter at said second station, signal suppressor means connected at said first station at a point in said directional path A—B previous to the point of connection of said first station transmitter, circuit means including rectifier members connected in said suppressor means for rendering same directionally sensitive to frequencies transmitted over said path in the direction A—B, signal detector means for detecting frequencies of said signal value in applied speech currents, and attenuating means controlled thereby to prevent frequencies of signal values which appear in speech transmissions of said directional characteristics from falsely operating said signal receiver at said second station, and signal suppressor means at said second station connected to said directional path B—A in a point in advance of the transmitter at said second station B, said latter signal suppressor means including rectifier circuit means connected therein for rendering same directionally sensitive to frequencies transmitted over said path in the direction B—A, signal detector means for detecting frequencies of said signal value in applied speech, and attenuating means controlled thereby to prevent frequencies of said signal frequency value which appear in speech transmissions effected in said direction B—A from improperly operating said signal receiver at said first station.

5. In a telephone system the combination of a communication path for linking a plurality of stations for communication purposes, signal transmitter means located at one of said stations (A) operative to transmit voice frequency signals over said path, signal receiver means located at a second one of said stations (B) for accomplishing signalling operations thereat, circuit control means connected therewith to render same directionally sensitive to signals transmitted by said signal transmitter means at said first station, signal transmitter means located at said second station operative to transmit voice frequency signals over said path in the direction of said first station, signal reecivеr means located at said first station for accomplishing signalling operations thereat, circuit control means connected therewith to render said latter receiver means directionally sensitive to signals transmitted by said signal transmitter at said second station, signal suppressor means connected to said path including rectifier circuit means connected therewith to render same directionally sensitive to frequencies transmitted over said path in the direction A—B, signal detector means for detecting signals in said speech of said signal value, and attenuating means controlled by said signal detector means to attenuate frequencies in such speech transmissions which are of said signal frequency value and thereby prevent same from falsely operating said signal receiver at said second station, and signal suppressor means connected to said path including rectifier circuit means connected thereto to render same directionally sensitive to frequencies transmitted over said path in the direction B—A signal detecting means for detecting signals in said speech of said signal value, and attenuating means controlled by said latter signal detecting means to attenuate frequencies in said speech transmissions which are of the signal frequencies in said speech transmissions which are of the signal frequency value, to thereby prevent improper operation of said signal receiver at said first station.

6. In a telephone system of the class described, a communication path having a first station A and a second station B connected at the respective ends thereof, signal transmitter means at said first station operative to transmit voice frequency signals of a given value over said path, signal receiver means at said second station including circuit control means connected thereat to render same directionally sensitive to signals transmitted by said signal transmitter at said first station, signal transmitter means at said second station operative to transmit voice frequency signals of a given value over said circuit to said first station, signal receiver means at said first station including circuit control means connected thereat to render same directionally sensitive to signals transmitted by said signal transmitter at said second station, signal suppressor means at said first station A including rectifier circuit means connected thereat to render same directionally sensitive to frequencies transmitted over said path in the direction A—B, said suppressor means being connected to said path between the transmitter and the point of speech application at station A; and signal suppressor means at said second station including rectifier circuit means connected thereat to render same directionally sensitive to frequencies transmitted over said path in the direction B—A, said suppressor means being connected to said path between the point of application of speech at said second station B and said transmitter located thereat, said signal suppressors each including signal detector means for detecting frequencies of said signal value appearing on said speech currents, and attenuating means controlled by said signal detecting means to attenuate same to prevent false operation of the respective voice signal receivers at each of the stations.

7. In a telephone system, the combination of a communication path having at least a first station A and a second station B connected at the respective ends thereof, signal transmitter means connected to the one station (A) operative to transmit voice frequency signals over said path to said second station, signal receiver means at said second station including circuit control means connected therewith to render same directionally sensitive to signals transmitted by said signal transmitter at said first station, signal transmitter means at said second station adapted to transmit voice frequency signals over said path, signal receiver means at said first station including circuit control means connected therewith to render same directionally sensitive to signals transmitted thereto from said signal transmitter at said second station, signal suppressor means at said first station including rectifier circuit means connected therewith to render same directionally sensitive to frequencies transmitted over said path in the direction A—B and interposed between the point of application of speech to said path at said first station and said transmitter located thereat, signal suppressor means at said second station including rectifier circuit means connected therewith to render same directionally sensitive to frequencies transmitted over said path in the direction B—A, said latter signal suppressor means being connected to said channel between the point of application of speech at said second station and the transmitter located thereat, said signal suppressors each comprising electronic signal detector means for monitoring the frequencies applied to said path and variable attenuation networks controlled by said electronic signal detector means for suppressing the frequencies in the speech transmissions corresponding to the frequencies of said transmitted signals.

8. An arrangement as set forth in claim 7 in which each of said electronic signal detector means is connected to said path between the point of speech application and transmitter for its associated station and is operative to regulate its associated variable attenuation network to introduce only so much attenuation into the speech circuit as is necessary to prevent the signal receivers from being inadvertently operated by similar frequencies in the speech transmissions.

9. In a telephone system of the class described, the combination of a circuit having a first station A and a second station B located at the respective ends thereof, a two-channel path interposed in said circuit between the A and B stations connected thereto, signal transmitter means connected to one of said channels adjacent to said first station, signal receiver means connected to said one channel at said second station including circuit control means connected therein to render same directionally sensitive to signals transmitted by said signal transmitter means over said one channel in the direction A—B, signal transmitter means connected to the other channel adjacent said second station, signal receiver means connected to said other channel adjacent the first station end thereof including circuit control means connected therein to render same directionally sensitive to signals transmitted over said other channel in the direction B—A, and a plurality of signal suppressor means connected in said circuit, one of said signal suppressor means including rectifier circuit arrangement means connected therewith to make same directionally sensitive to frequencies transmitted over said circuit in the direction A—B, signal detector means for detecting frequencies in the speech transmitted in such direction which correspond to said signal frequency, and attenuating means operatively controlled by said signal detector means to attenuate said signal frequencies in said directional speech the other of said signal suppressor means including rectifier circuit means connected to make same directionally sensitive to frequencies transmitted over said circuit in the direction B—A, signal detector means for detecting the frequencies in the speech transmitted in such second direction which correspond to said signal frequencies, and attenuator means operated by said latter signal detector means to attenuate the signal frequencies in said speech transmitted in said latter direction.

10. An arrangement as set forth in claim 1 which includes a band filter unit connected to said path in advance of each signal suppressor means relative to the point of speech application thereat, said band filter unit being operative to pass only the frequency in the speech band which corresponds substantially to said signalling frequency.

11. An arrangement as set forth in claim 1 which includes a band filter unit connected in shunt of each of said signal suppressor means for passing frequencies in the speech band which are removed from said signalling frequency.

12. An arrangement as set forth in claim 1 which includes a first band filter unit connected in the speech circuit in advance of its associated signal suppressor means which is operative to pass only the frequency in the speech band corresponding substantially to said signalling frequency, and a second band filter unit connected in shunt of each signal suppressor means for passing frequencies in the speech band removed from said signal frequency.

13. An arrangement as set forth in claim 9 in which said one signal suppressor means is associated with station A and said other signal suppressor means is associated with station B, and each of said stations include a first band filter unit connected in advance of each signal suppressor relative to the point of speech application thereat for passing only the frequency in the speech band which corresponds substantially to said signalling frequency, and a band filter connected in shunt of each signal suppressor for passing frequencies in the supeech band which are removed from said signalling frequency.

14. An arrangement as set forth in claim 1 in which each of said signal detector means comprises electronic tube means connected to said path, and a retarding circuit interposed in said path in parallel with said electronic tube means, the propagation time of which retarding circuit is at least equal to the response time of said signal suppressor means.

15. In a telephone system of the class described, the combination of a two-wire circuit having a first station (A) and a second station (B) located at the respective ends thereof, a four-wire, two-channel path interposed in said two-wire circuit between the (A) and (B) stations connected thereto, signal transmitter means connected to one of said channels of said four-wire circuit adjacent the first station end thereof, signal receiver means connected to the same channel of said four-wire circuit at said second station end including circuit control means connected to render same directionally sensitive to signals transmitted by said signal transmitter means over said one channel in the direction A—B, signal transmitter means connected to the other channel adjacent said second station, signal receiver means connected to said other channel adjacent the first station end thereof including circuit control means connected therewith to render same directionally sensitive to signals transmitted over said other channel in the direction B—A, and a plurality of signal suppressor means inserted in said system, one of said signal suppressor means including rectifier circuit means connected therewith to render same directionally sensitive to frequencies transmitted over said system in the direction A—B, signal detector means for detecting frequencies in the speech transmitted in such direction which correspond to said signal frequencies and attenuating means controlled by said signal detector means to attenuate signal frequencies in the transmitted speech as detected thereby; the other of said signal suppressor means including rectifier circuit means connected therewith to render same directionally sensitive to frequencies transmitted over said system in the direction B—A, signal detector means connected therewith for detecting frequencies of said signal value in speech applied in such direction and attenuation means controlled by said signal detector means to introduce attenuation into the system which is of a value sufficient to prevent improper operation of the signal receiver by frequencies in the speech transmitted in such direction which correspond to such signal frequencies.

16. An arrangement as set forth in claim 15 in which said signal suppressor means are connected in the two-wire portion of said system at each of said stations.

17. An arrangement as set forth in claim 15 in which one of said signal suppressors is connected in one of said channels and the other of said signal suppressors is connected in the other of said channels.

18. In a telephone system of the class described, the combination of a communication path for conducting speech transmissions as applied thereto, signal transmitter means connected to said path for transmitting voice frequency signals thereover, signal receiver means connected to said path for accomplishing signal operations responsive to receipt of said voice frequency signals from said transmitter, and signal suppressor means connected to said path between said signal transmitter and the points of speech applications thereto in the direction of transmission toward said receiver means, said suppressor means including signal detection means connected to monitor said directional speech transmissions and operative responsive to the presence of frequencies in said speech transmissions which are of said signal frequency, and attenuation means controlled by said signal detection means, to alter said signal frequency as detected to prevent false operation of said signal receiver by said equivalent frequencies in said speech transmissions.

WILLEM C. DE VRIES.

REFERENCES CITED

The following references are of record in the file of this patent:

UNITED STATES PATENTS

| Number | Name | Date |
|---|---|---|
| 1,709,554 | Black | Apr. 16, 1929 |
| 1,711,651 | Pruden | May 7, 1929 |
| 2,117,721 | Hornickel | May 17, 1938 |
| 2,138,613 | Pruden | Nov. 29, 1938 |
| 2,299,821 | Horton | Oct. 27, 1942 |
| 2,410,149 | Clark | Oct. 29, 1946 |